United States Patent [19]
Dial et al.

[11] 4,043,545
[45] Aug. 23, 1977

[54] SEALED CUSHIONING UNIT

[75] Inventors: Darrell D. Dial, Fort Worth; Robert J. von Bose, Arlington, both of Tex.

[73] Assignee: Halliburton Company, Duncan, Okla.

[21] Appl. No.: 538,803

[22] Filed: Jan. 6, 1975

Related U.S. Application Data

[62] Division of Ser. No. 453,980, March 22, 1974, Pat. No. 3,864,972.

[51] Int. Cl.² .............................................. F16F 9/10
[52] U.S. Cl. ...................................... 267/116; 61/48; 114/219; 213/43; 267/65 R
[58] Field of Search ........................ 267/139, 116, 65; 61/48, 46; 114/219, 230, 220; 293/DIG. 2, 1, 60, 84; 213/8, 43, 7; 188/94

[56] References Cited

U.S. PATENT DOCUMENTS

| | | | |
|---|---|---|---|
| 2,936,860 | 5/1960 | Peras | 293/DIG. 2 |
| 3,109,404 | 11/1963 | Hartel | 114/219 |
| 3,658,314 | 4/1972 | Luzsicza | 267/121 |
| 3,729,101 | 4/1973 | Brambilla et al. | 213/43 |
| 3,791,534 | 2/1974 | Stephenson | 213/43 |
| 3,795,390 | 3/1974 | Kendall et al. | 213/43 |
| 3,830,329 | 8/1974 | Sumida | 293/1 |

Primary Examiner—James B. Marbert
Attorney, Agent, or Firm—John H. Tregoning

[57] ABSTRACT

A method and apparatus for cushioning motion and dissipating impact energy, preferably in a marine environment, including a piston and cylinder assembly, impedance means associated with the piston and cylinder for impeding translation of the piston within the cylinder assembly and an isolation and restoring assembly protectively surrounding the piston and cylinder assembly and continuously biasing the piston and cylinder assembly in a normally extended position operable to dissipate impact energy. The method includes the steps of isolating the piston and cylinder assembly from an ambient environment, cushioning impact forces imparted to the piston and cylinder assembly and restoring the assembly in an extended posture operable to dissipate subsequent impact energy imparted thereto.

6 Claims, 16 Drawing Figures

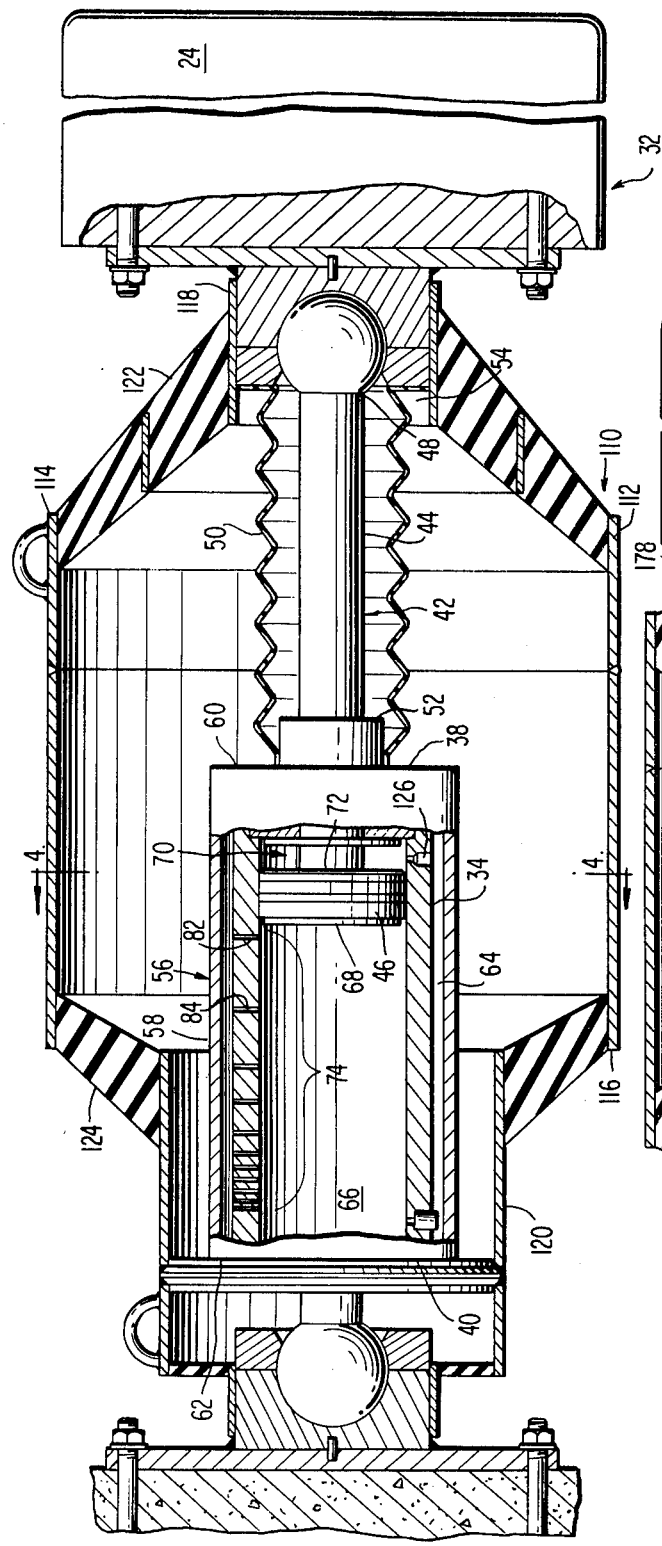
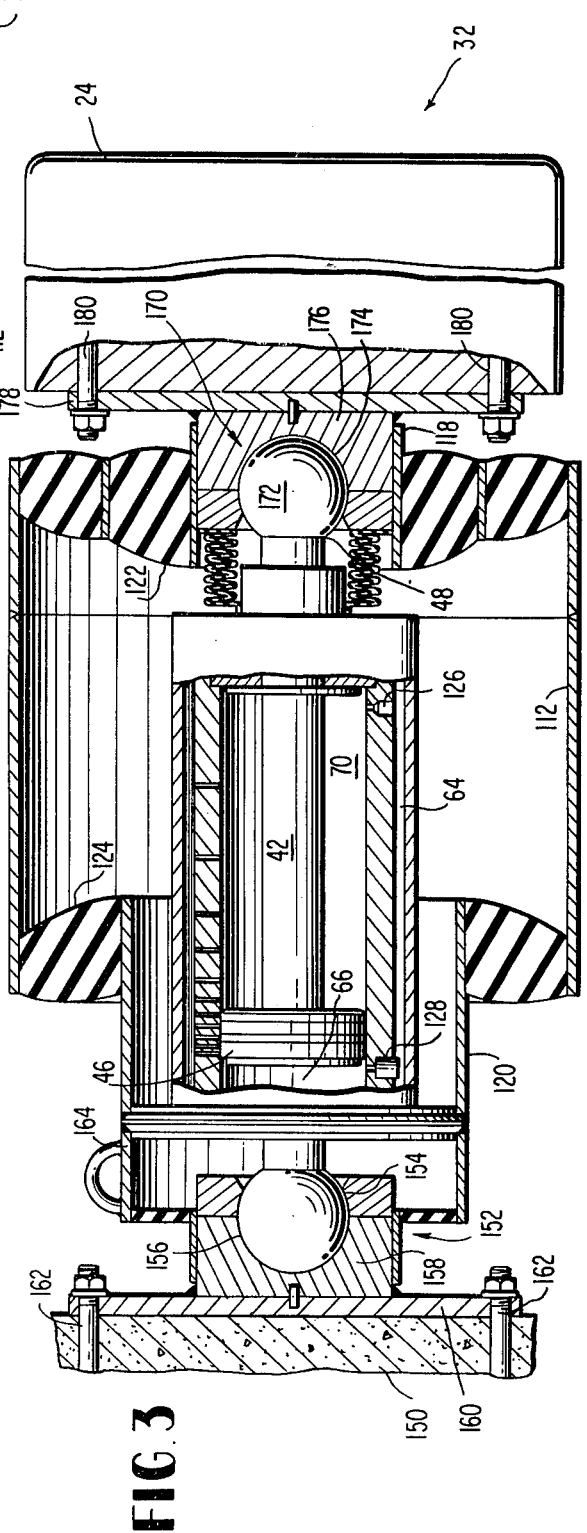
FIG. 2
FIG. 3

OPTIMAL DESIGN CURVE

WAVE ACTION RESPONSE

NOMINAL IMPACT ENERGY

OVERLOAD CAPACITY

SEALED CUSHIONING UNIT

This is a division, of application Ser. No. 453,980, filed 3-22-74 now U.S. Pat. No. 3,864,972.

BACKGROUND AND BRIEF SUMMARY OF THE INVENTION

This invention relates to a method and apparatus for dissipating impact energy between relative converging members. More particularly the invention relates to a method and apparatus for dissipating energy imparted to a protective marine bumper from impact forces imparted thereto by a floating vessel or the like.

In the past in both onshore and offshort locations some form of fendering or protective bumper system has been utilized to dissipate kinetic energies imparted from a floating vessel into a relatively stationary mooring or berthing facility. Such devices may range from the expedient utilization of a worn out tire casing to elaborate elastomeric cellular fendering units of a variant and often intricate configuration.

While such systems have exhibited at least a degree of utility in protecting moored vessels from damage, room for significant improvement remains. In this connection elastomeric units typically exhibit a somewhat linear sloping stroke/force relationship at least during initial impact loading. Therefore it is necessay to design for large deflections in order to dissipate high energy impact loads. Further upon full compression elastomeric units typically exhibit a recoil or rebound force which is transmitted back into the floating vessel. Still further elastomeric designs which are operable to efficiently accommodate cyclic low load levels such as wave action induced forces are often unsuited to dissipate high level impact energies occasioned during a berthing maneuver.

The problems enumerated in the foregoing are not intended to be exhaustive but rather are among many which tend to impair the effectiveness of the previously known energy dissipation systems. Other noteworthy problems may also exist, however, those presented in the discussion above should be sufficient to demonstrate that marine cushioning systems appearing in the art have not been altogether satisfactory. An energy dissipation assembly according to the present invention is intended to at least obviate or minimize problems of the type previously noted.

More specifically the subject invention is directed to an improved method and apparatus for dissipating energy, preferably in a marine bumper system, wherein a piston and a cylinder assembly is connected at the ends thereof between a protective bumper and a marine installation such as an onshore pier, an offshore berthing dolphin, an offshore tower leg, etc.

The hydraulic cylinder is comprised of an inner generally circular high pressure cylinder which is operable to receive in intimate translation a piston body. The high pressure cylinder is provided with a plurality of radially extending exponentially spaced metering ports whereby fluid from within the interior of the cylinder may be metered into a surrounding low pressure return chamber formed by a relatively thin cylindrical wall coaxially mounted about the high pressure cylinder.

Approximately a first 20 percent of the stroke of the piston body is merely impeded by metering fluid within the high pressure cylinder through unvalved ports and back into the high pressure cylinder upon the opposite side of the piston body assembly through a return port. Such low level impedance is highly effective to dissipate cyclic wave action induced forces.

The remaining 80 percent of the exponentially spaced ports are preferably fitted with normally closed preset pressure relief or check valve assemblies which are actuated to an open posture only upon achieving a predetermined quantum of impact energy. Further, each of the present check valve units has maximum capacity limits and is operable to accommodate extremely high level impact forces which may be occassioned during an accidental high velocity berthing operation.

The hydraulic cushioning assembly is isolated from a hostile ambient marine environment by the provision of an encapsulating cylindrical housing connected at the ends thereof to the hydraulic unit through annular generally frustoconically shaped elastomeric members.

The isolation housing is axially dimensioned so as to place the elastomeric units under bending and shear loading even during full extension of the hydraulic cushioning unit. Accordingly once impact energy forces have been dissipated metering of fluid through the hydraulic cylinder wall, restoring forces provided by the flex and shear of the elastomeric units rapidly restore the cushioning unit to an extended posture ready to receive and dissipate further impact energies. A further metering port, however, is positioned adjacent the restoring end of the cylinder to eliminate any rapid rebound energy from the elastomeric members.

The method entails the steps of isolating the piston and cylinder assembly from a hostile corrosive marine environment while cushioning low level impact forces against the marine protective bumper by flexing and shearing the elastomeric annulus members and translating the piston body within the high pressure cylinder. The method further includes the steps of restoring the piston body to a position of axial extension by application of the developed flex and shear of the elastomeric annulus members while metering fluid from behind the piston body through the wall of the high pressure fluid cylinder. Such metering of fluid during the restoration step effectively minimizes or eliminates the possibility of rebound energy being input to the floating vessel.

Through the provision of the instant hydraulic cushioning assembly it has been found that cushioning of kinetic energies in a marine environment including low level cyclic wave action forces, normal impact berthing energy and excessive impact energy is effected by a force level diagram of near optimum performance and efficiency.

Further, the exterior housing effectively isolates the hydraulic cushioning unit from a hostile and corrosive marine environment while synergistically providing a highly efficient restoring mechanism for maintaining the cushioning unit in an extended posture operable to receive and dissipate impact energy.

In presenting the invention, reference will now be made to a preferred embodiment. This preferred embodiment is by way of illustration and not restriction or limitation with respect to the present invention and the manner in which it may be practiced.

THE DRAWINGS

A presently preferred embodiment of the invention is set forth in the appended drawings in which:

FIG. 1 is a schematic plan view of a berthing dolphin and moored vessel positioned adjacent the dolphin and being spaced therefrom by a protective bumper system including a plurality of energy dissipating devices according to a preferred embodiment of the invention;

FIG. 2, note sheet 2, is a side elevational detailed view, partially broken away, disclosing an energy dissipating and cushioning unit according to a preferred embodiment of the invention in a fully extended posture operable to receive and dissipate impact energy;

FIG. 3 is a side elevational detailed view, partially broken away, disclosing the energy dissipating and cushioning unit, disclosed in FIG. 2, in a fully compressed or buff posture as might exist immediately following dissipation of kinetic energy and prior to automatic restoration of the unit to an extended or restored posture, as depicted in FIG. 2;

FIG. 4, note sheet 1, is a cross-sectional view taken along section line 4—4 in FIG. 2 and discloses structural details of a high pressure circular cylindrical side wall and a generally square fluid-tight surrounding housing comprising a portion of the hydraulic cushioning unit;

FIG. 5, note sheet 3, is a top view of a preset clock valve positioned within a plurality of ports extending through the high pressure cylinder wall;

FIG. 6 is a sectional detailed view taken along section line 6—6 of FIG. 5 and discloses the relationship of components within the interior of the preset check valve assembly;

FIG. 7 discloses a cross-sectional detailed view of a normally closed check valve assembly operable to provide a high volume return flow of fluid into the high pressure cylinder during restoration of the energy dissipation and cushioning unit;

FIG. 8 discloses a force/stroke or energy dissipation diagram illustrating optimum energy dissipation performance of a cushioning unit;

FIG. 9 discloses a typical force/stroke energy dissipation diagram of the type which may be exhibited by the subject invention in response to low level wave action forces imparted to a protective dock bumper;

FIG. 10 discloses a typical force/stroke energy dissipation diagram for normal berthing impact energies which might be occasioned under normal service conditions;

FIG. 11 discloses a force/stroke energy dissipation diagram indicating an overload capacity capability of the subject invention which is automatically available in instances of accidental excessive velocity impact loading during a berthing operation;

FIG. 12 discloses a comparative force/stroke or kinetic energy dissipation diagram for the subject invention with respect to conventional bumper cushioning devices; and FIGS. 12A-D disclose schematic pictorial views of dock bumper units which are depicted on the kinetic energy dissipation diagram of FIG. 12.

DETAILED DESCRIPTION

Context of the Invention

Figure 1:
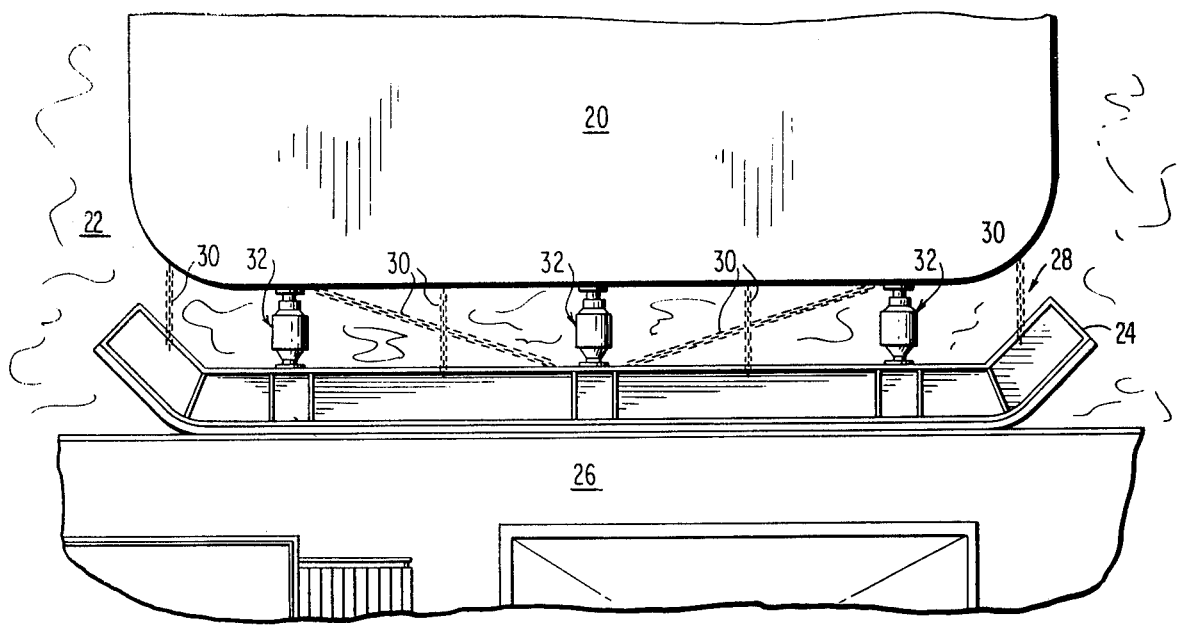

With reference now to the drawings, and particularly to FIG. 1 thereof, there will be seen a typical operational environment for the subject method and apparatus for cushioning and dissipating impact forces according to a preferred embodiment of the invention. More particularly a pier 20 is disclosed of the type which projects outwardly into a body of water 22. The seaward face of the pier carries a docking or mooring bumper 24 to protect the pier from direct mechanical impact loading from a moored vessel 26.

The pier 20 may be of a variety of designs, including a shore mounted installation or an offshore berthing dolphin or the like. Still further, the pier 20 may be representative of any offshore structure which requires the protection of a docking bumper 24.

In this connection a floating vessel 26 such as a material tanker, barge or the like, is highly likely to damage a fixed structure during a normal berthing operation unless some form of cushioning or energy dissipation is provided. Moreover, since the vessel 26 is moored against the pier 20, wave action tends to cyclically nudge the vessel against the relatively fixed and immobile pier. Accordingly, here again, some form of energy dissipation is required in order to minimize the possiblity of damage to the pier or the hull of the contiguous vessel.

The docking bumper 24 is connected to the pier 20 through the provision of a system 28 of countering linkages 30. Impact energy imparted to the bumper 24 is dissipated by a plurality of generally orthogonally mounted hydraulic cushioning units 32. The hydraulic cushioning units 32 comprise the subject matter of the instant invention and, as will be discussed in detail hereinafter, are operable to cushion impact loads and dissipate kinetic energy in a highly efficient manner over a wide range of impact loading conditions.

While the hydraulic cushioning units 32 have been depicted in FIG. 1 and discussed above in connection with a preferred marine protective bumper system it will be appreciated that the subject hydraulic cushioning units are not limited to a marine bumper environment and may find advantages utilization in a plurality of diverse applications.

CUSHIONING ASSEMBLY

Figure 4:
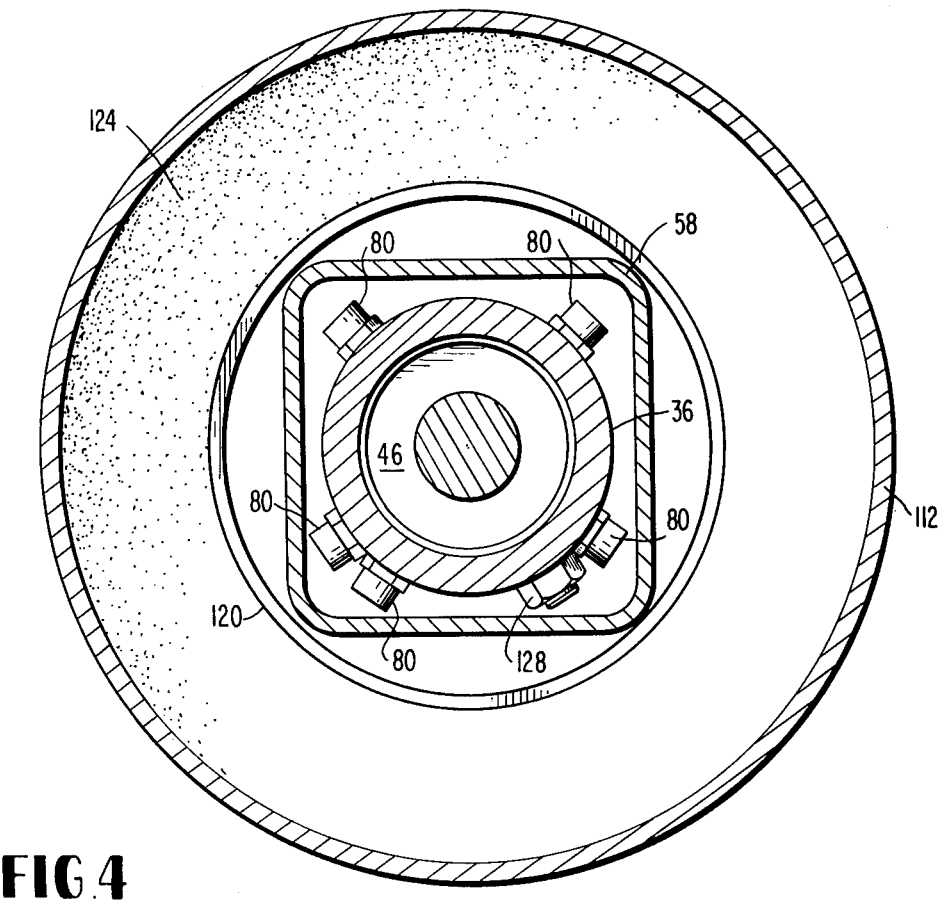

Referring now particularly to FIGS. 2-4, there will be seen detailed structural views of a hydraulic cushioning unit 32 according to a preferred embodiment of the invention.

The hydraulic cushioning unit includes a high pressure cylinder 34 which is comprised of a relatively thick circular side wall 36, note FIG. 4, a first end wall 38 at a restoring end of the cylinder and a second end wall 40 at a buff end of the cylinder. The first and second cylinder ends are functionally designated as the restoring and buff ends in accordance with the direction of motion of a piston assembly 42, at least partially within the cylinder.

More particularly, a piston rod 44 coaxially extends through the first end wall 38 and connects with a piston body member 46 mounted for translation and intimate wiping action along the cylindrical side walls 36 of the high pressure cylinder 34. A second or distal end 48 of the piston rod 44 projects outwardly of the high pressure cylinder 34 and is preferably connected to a dock bumper member 24 in a manner to be discussed more fully hereinafter. In order to minimize the tendency of foreign matter to collect upon and abraid the piston rod 44, an accordian sleeve 50 is mounted between an extension collar 52 projecting outwardly of the first end wall 38 and a retaining collar 54 operably connected adjacent the bumper member 24.

The hydraulic cylinder 34 is provided with a fluid impedance system 56 including a generally thin shell fluid-tight, low pressure, housing 58 having first and second end walls 60 and 62, respectively, for surrounding said high pressure cylinder 34 and providing a fluid chamber 64 extending about the high pressure cylinder side wall 36.

The piston body means 46 divides the interior of the hydraulic cylinder 34 into a first interior, buff, impedance zone 66 between a first face 68 of the piston body 46 and the second end wall 40 of the cylinder 34. A second interior, restoration, impedance zone 70 is defined by a second face 72 of the piston body 46 and the first or restoring end wall 38 of the cylinder 34.

The cylinder 34 as well as the surrounding chamber 64 is substantially filled with a fluid such that translatory motion of the piston body member 46 due to impact loading upon the distal end 48 of the piston rod assembly 42 is impeded or cushioned in order to advantageously dissipate impact energy.

This cushioning is facilitated by the provision of a plurality of generally radially extending and longitudinally, and energy dissipation, exponentially spaced ports 74 fashioned through the high pressure cylinder wall 36. The exponential spacing of the port extends from the buff end 40 of the high pressure cylindrical wall 36 and progresses toward the restoring end 38 thereof.

The exponential spacing herein referred to corresponds generally to that described, for example, in U.S. Pat. No. 3,301,410, patented Jan. 31, 1967 and assigned to the assignee of the subject application. The disclosure of this Seay patent is hereby incorporated by reference as though set forth at length. Briefly, however, with the metering orifices spaced exponentially, kinetic energy is absorbed uniformly throughout the stroke of the unit, thus, pressure within the high pressure cylinder 36 and the force applied to the unit approach uniform and minimum values throughout the stroke.

While the ports 74 are shown in longitudinal alignment in FIGS. 2 and 3, such illustration is for convenience only and in actuality the ports may be circumferentially spaced, note FIG. 4, about the high pressure cylinder 36 as desired.

Figure 5:
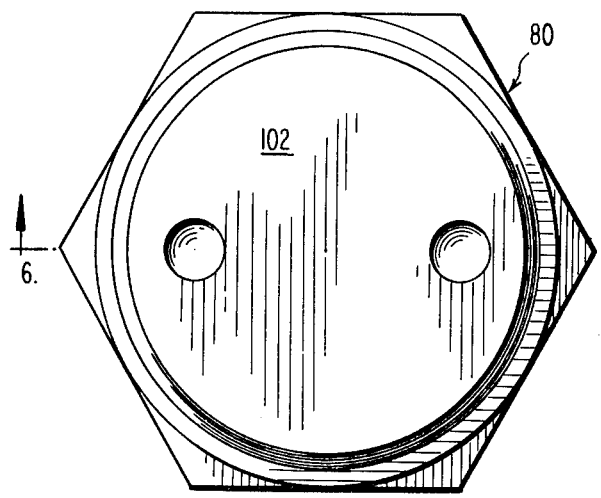

Referring now particularly to FIGS. 4 and 5 there will be seen detailed views of a preset check valve 80 of a type operable to be positioned within a plurality of the ports 74, note FIG. 4. The first 20 percent of the ports of the high pressure cylinder 36 are preferably unvalved to accommodate low level cyclic wave action forces. The remaining 80 percent of the ports however are optimumly fitted with preset check valves 80. In terms of numerical values this would dictate that a first port 82 and possibly (depending upon the control design spacing) a second port 84 or more may be unvalved while the remainder of the ports 74 will be fitted with preset check valves 80 to accommodate high level full stroke impact energy dissipation.

Figure 6:
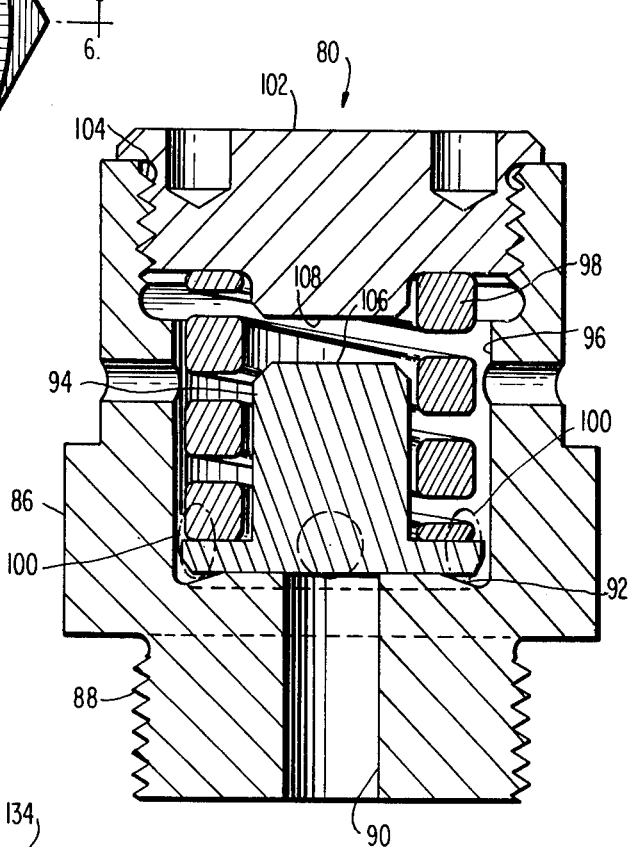

With specific reference now to FIGS. 5 and 6 it will be seen that the check valves 80 include a valve body 86 which is threaded on a lower end 88 thereof to be readily mounted upon the high pressure cylinder wall 36 (note FIG. 4). A central port 90 extends through the base of the valve and projects upwardly to a termination point at a raised annular valve seat 92. A generally inverted T-shaped valve plunger 94 is positioned within an internal cavity 96 of the valve body 86 and is biased downwardly against the valve seat 92 by the provision of a coil compression spring 98. A plurality of relatively high flow passages 100 are radially fashioned through the valve body 86 and provide fluid communication between the chamber 96 and the return flow passage 64.

Tension on the compression spring 98 is preset by an inwardly projecting cap 102 which is threadedly received within an upper portion 104 of the valve body 86. Appropriate selection of an axial dimension for the valve cap 102 serves to establish a previously determined preset condition of the valve plunger 94 against the valve seat 92.

More particularly the valve plunger 94 is normally biased into a closed posture against the valve seat 92 thus preventing flow of fluid through the valve ports 94 within the high pressure cylinder wall 36. In the event however sufficient fluid pressure is generated within the buff impedance zone 66 to lift the valve plunger 94, fluid will flow through the passage 90 to be metered between the valve body 94 and the annular seat 92. The capacity of radially extending ports 100 is much greater then the annular orifice provided by the valve seat 92 and valve plunger 94 combination, thus regulation of flow is provided by the extent to which the valve plunger 94 is lifted by fluid pressure within the buff end of the high pressure cylinder.

Continuing in this vein, a certain preset pressure within the high pressure cylinder 36 is necessary in order to provide an initial flow through the valve 80. This pressure is typically selected as 100% of the design capacity of the hydraulic unit.

In some instances, such as during berthing with excessive velocity, very high pressures are generated within the buff impedance zone 66, in such instances the valves 80 will fully open until an upper planar surface 106 of the valve body abuts against planar surface 108 of the valve cap.

The dual character of the valve 80 serves to provide normal valved cushioning to accommodate normal impact load occasioned against a dock bumper and also high level valved cushioning to accommodate emergency or overload capacity due to excessive berthing velocities of a floating vessel againt a dock bumper.

While the foregoing discussion has determined a specific embodiment of a preset check valve those skilled in the art will appreciate that other specific valve designs may be utilized as desired.

In brief summary, buff motion of the piston body 46 is impeded by fluid being metered initially through an open orifice 82, and in some instances a second open orifice 84 or more and then at higher predetermined pressures through the remainder of the exponentially spaced ports 74.

ISOLATION AND RESTORING SYSTEM

Referring particularly to FIGS. 2 and 3 there will be seen an isolation and restoring system 110 including an outer generally cylindrical wall structure 112 having a first end 114 extending toward the distal end 48 of the piston rod 42 and a second end 116 extending toward the second end of the hydraulic cylinder 34.

A generally cylindrical mounting assembly 118 is operably connected to the distal end 48 of the piston rod 42 and a similar generally cylindrical mounting assembly 120 is operably connected to the second end 40 of the hydraulic cylinder 34.

Generally frustroconically configured elastomeric members 122 and 124 are mounted between the ends 114 and 116 of the cylinder 112 and the mounting assemblies 118 and 120 respectively. The mounting assemblies 118, frustroconical member 122, cylindrical member 112, frustroconical member 124 and mounting assembly 120 serve in combination to enhouse and encapsule in sealed isolation the interiorly positioned hydraulic cylinder assembly. Such isolation is preferably established at an assembly plant and is particularly significant when the hydraulic cushioning unit is being utilized in a generally corrosive marine environment.

As discussed in the foregoing the piston body 46 operably translates in response to impact loads through the high pressure cylinder 36 to a buff end 40 thereof. Once the unit is compressed however, note specifically FIG. 3, it is highly desirable to quickly restore the cylinder without producing an undesirable rebound force.

Restoration force for the subject hydraulic cushioning assembly is achieved through the flexure and shear action of the elastomeric member 122 and 124. More particularly, once impact energy is dissipated the frustroconical elastomeric members will flex to quickly restore the unit to a nominal extended posture. Rebound energy however, is not imparted to the dock bumper 24 and into a contiguously moored juxtaposed vessel. In this connection the higher pressure cylinder wall 36 is fitted with a unitary relatively high capacity restoring port 126 which extends through the cylinder wall 36 generally at the first or restored end of the cushioning unit. Accordingly, as the piston body 46 translates through the hydraulic cylinder toward the first or restored end, fluid will be metered through the port 126 and into the surrounding annular fluid passage 64.

In order to pressure balance the system fluid within passage 64 must flow into the buff end of the cylinder. Such flow is accommodated by the provision of a high capacity return check valve 128 positioned at the buff end 40 of the hydraulic cylinder, note FIG. 3.

Figure 7:
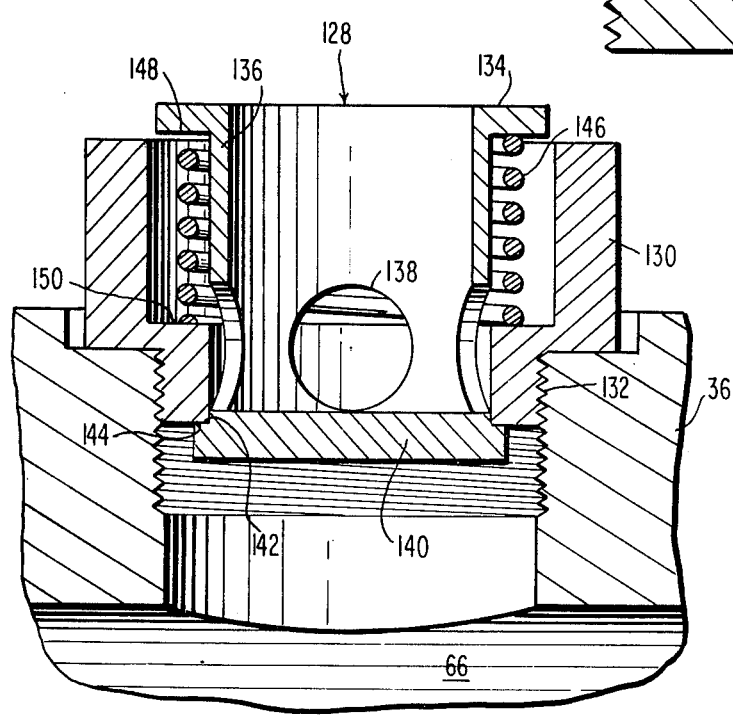

Structural details of the high capacity check valve mechanism 128 are shown in FIG. 7. As they are shown valve 128 comprises a body 130 connected by threaded coupling means 132 to the exterior of high pressure cylinder wall 36 (note FIG. 4). A valve member 134 is telescopingly mounted within valve body 130.

Valve member 134 is generally cylindrical in character and comprises a cylindrical side wall 136 provided with a plurality of radial ports 138. An imperforate head wall 140, connected with side wall 136 provides a sealing surface 142 to sealing engage a valve seat 144 formed on valve body 130. A coil spring 146 interposed between valve member carried abuttment 148 and a valve body carried abuttment 150 serves to yieldably bias the valve member 134 in a closed position.

In response to a relatively low pressure in annular chamber 64, subsequent to a prior buff movement, the valve 134 will automatically open so as to allow the return flow of fluid from the cavity 64 into the buff zone 66.

UNIVERSAL MOUNTING ASSEMBLIES

In order to minimize the transfer of lateral forces into the generally axially acting hydraulic cushioning unit one end of the assembly is universally connected to a marine means 150 such as a dock, pier, offshore tower, or in some instances even a vessel.

A universal mounting assembly 152 includes a spherical ball 154 operably encapsuled within a generally spherical cavity 156 fashioned within a mounting block 158. The mounting block 158 in turn is fixedly connected to a plate 160 which may be connected to the pier 150 by conventional threaded fasteners 162 or the like.

The other end of the mounting block 158 is fitted with a cylindrical shell 164 which in turn is weldingly connected to the mounting unit 100 of the isolation and restoring system.

In a similar vein the other end of the hydraulic cushioning assembly is provided with a universal mounting assembly 170 including a spherical connecting member 172 mounted at the distal end 48 of the piston rod 42 and being received within a compatibly dimensioned spherical cavity 174 fashioned within a mounting block 176. The mounting block at one end is weldingly connected to a mounting plate 178 which in turn is connected to a bumper 24 through the provision of conventional threaded fasteners 180. The other end of the mounting block 176 is connected to the mounting cylinder 118 of the restoring and isolation system adjacent the distal end of the piston rod.

Through the provision of the universal mounting assemblies at either end of the hydraulic cushioning unit lateral forces will be passed through the mounting assemblies, only axially directed components thereof will be imparted to the hydraulic cushioning unit.

ENERGY DISSIPATION PERFORMANCE DIAGRAMS

Turning now to FIGS. 8 through 11, there will be seen force displacements or energy performance diagrams depicting an optimum standard and various modes of actual energy dissipation operation of the subject hydraulic cushioning invention.

Figure 8:
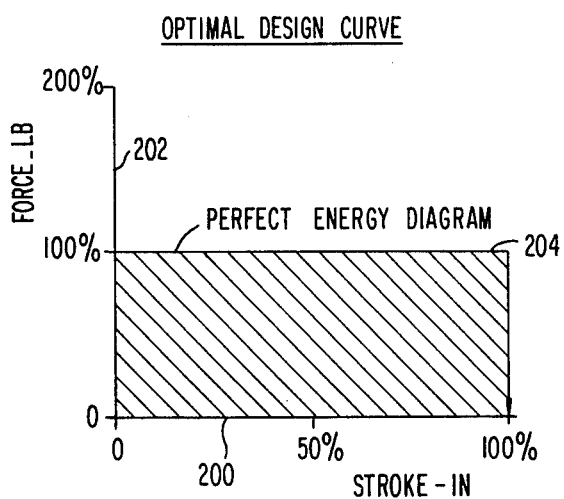

More particularly and with reference to FIG. 8, there is disclosed an optimal design curve wherein the abscissa 200 comprises percent stroke capacity of a unit and the ordinate 202 represents percent of designed force levels.

A perfect energy diagram would comprise a rectangular trace wherein 100 percent of design force levels are immediately realized with minimal stroke and such force levels are maintained in a horizontal continuous condition throughout 100 percent of the stroke whereby the input energy will have been dissipated. Once the input energy is dissipated, the force level would fall vertically to zero and the unit would be restored with zero force utilization. The area disclosed in cross-hatching within rectangle 204 represents the amount of kinetic energy absorbed by a perfect energy dissipation device.

Figure 9:
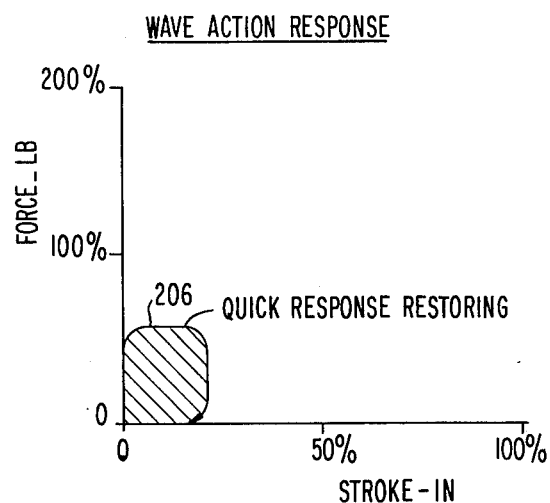

Turning now to FIG. 9, there will be seen a performance diagram traced in accordance with one operative mode of the subject invention wherein cyclic wave action impulses are absorbed and dissipated by the subject invention. More particularly, for very low level wave action forces, the piston body 46 will traverse a short stroke distance, possibly 20 percent or less of its designed capacity. During this first 20 percent stroke the unvalved port 82 and possibly port 84 will be utilized with the valves 80 maintained in a preset closed posture.

The energy dissipation trace 206 is a generally square response diagram wherein the energy is absorbed at approximately 50 percent of the design force level over 20 percent of the design stroke. The restoring mechanism is operable to quickly restore the unit to a fully extended operative posture. It will be appreciated by those skilled in the art that the low level energy dissipation provided by the subject system approaches a perfect energy diagram.

Figure 10:
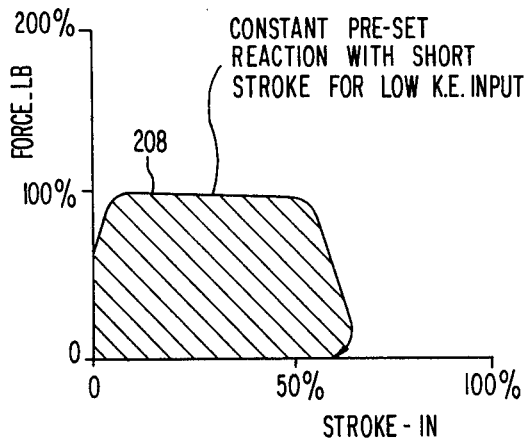

Referring now to FIG. 10, there will be seen a nominal energy performance diagram 208 for a hydraulic unit according to the subject invention wherein sufficient impact energy is occasioned so as to open the preset valves and thus dissipate energy in accordance with utilization of 100 percent of the nominal designed force level for the hydraulic cushioning unit. Because of a relatively low impact energy level the stroke is only 50 percent to 60 percent of nominal design capacity, and thus the unit will quickly restore itself to accommodate subsequent impact loads. Here again those skilled in the art will recognize that diagram 208 is substantially rectangular and thus represents a near perfect energy dissipation performance response.

Figure 11:
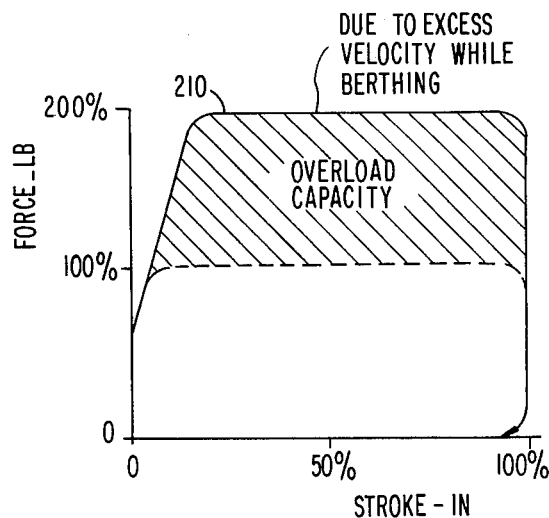

With reference now to FIG. 11, there is disclosed an overload energy diagram 210 wherein overload capacity is accommodated by the subject cushioning unit to accommodate excessive berthing velocities. The fluid pressure in the buff impedance zone 66 reaches a magnitude to completely open the valve 94 and thus planar surface 106 will abut against the cap 108. This maximum opening is designed to cushion approximately 200 percent the nominal designed capacity of the unit and all of the stroke is utilized to dissipate the kinetic energy imparted to the hydraulic cushioning unit. Here again a near perfect energy dissipation performance diagram is exhibited.

Referring now to FIGS. 12 and 12A–D, there will be seen comparative force/deflection or energy dissipation diagrams for various commercially available shock absorber assemblies for a dock bumper system as compared with an energy dissipation diagram for the subject hydraulic shock absorbing system. More particularly FIG. 12 discloses a grid with deflection in inches along the abscissa and force levels in thousands of pounds or KIPS along the ordinate.

Figure 12:
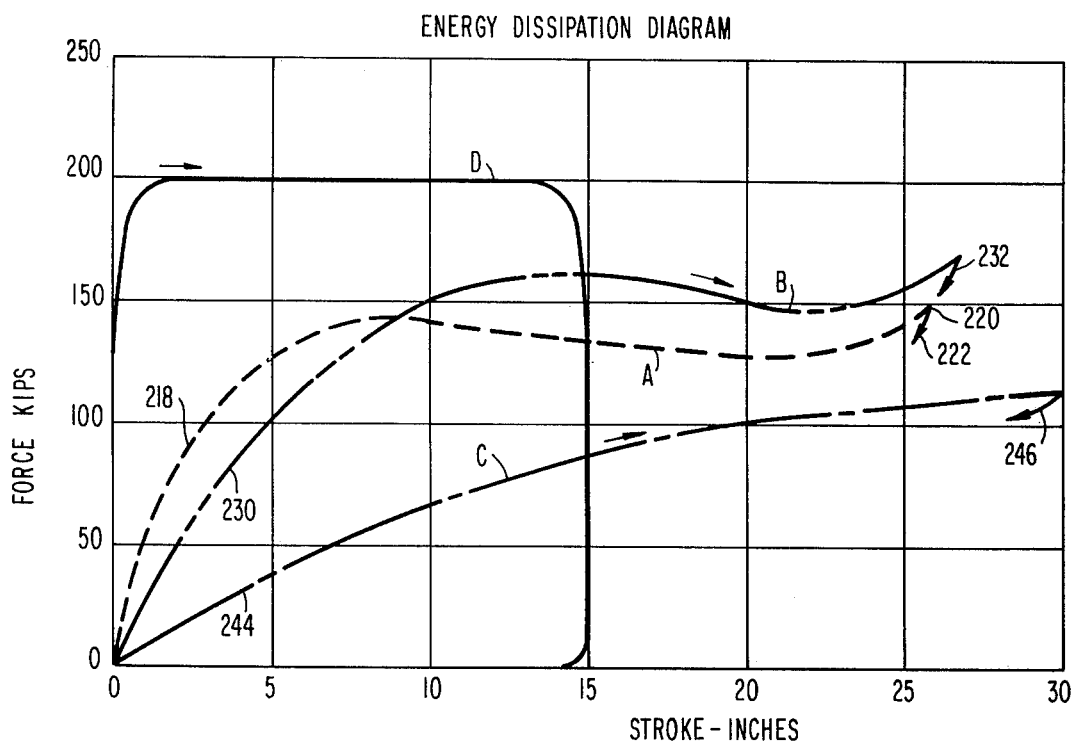
Figure 12A:
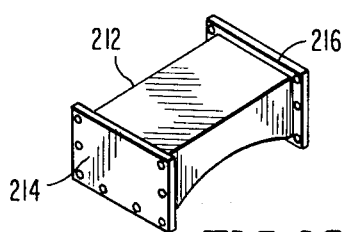

A first diagram A represents the force/deflection or energy dissipation for the unit pictorially disclosed in FIG. 12A. This unit comprises a generally solid elastomeric block of rubber 212 with mounting plates 214 and 216 affixed to the ends thereof. Trace A is typical of the previously known elastomeric units and may be characterized as comprising a linearly sloping first segment 218 wherein the elastomeric unit 212 is deflecting and the energy absorption is gradually increasing. At the end of the stroke when the energy has been dissipated as at 220 an undesirable rebound force 222 is imparted by the compressed elastomeric unit back to the marine vessel or the like.

Figure 12C:
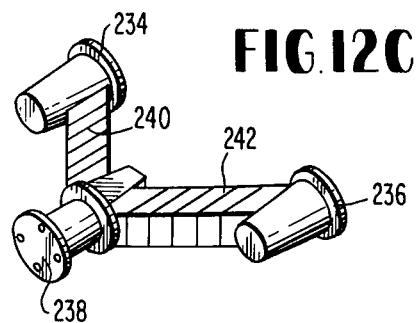
Figure 12B:
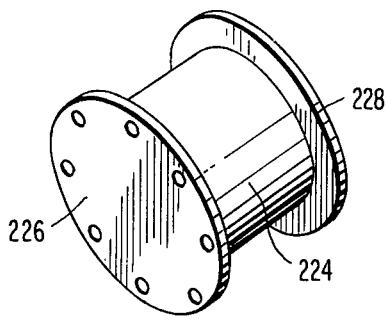

A second diagram B represents the force/deflection or energy dissipation performance for a cushioning unit such as depicted in FIG. 12B. More particularly, this unit is comprised of a cell-type cylindrical elastomeric body 224 which is fitted at either end with mounting plates 226 and 228. Trace B is similar to trace A and may generally be characterized as being comprised of a sloping initial segment 230 and a rebound force 232.

A third diagram C represents energy dissipation capability for a cushioning unit such as depicted in FIG. 12C. This unit includes a pair 234 and 236 of mounting assemblies and an intermediate oppositely directed assembly 238. Elastomeric arms 240 and 242 connect the units 234 and 236 respectively to the intermediate member 238. The performance diagram for this assembly again includes an initial sloping segment 244 coupled with a rebound force 246.

Figure 12D:
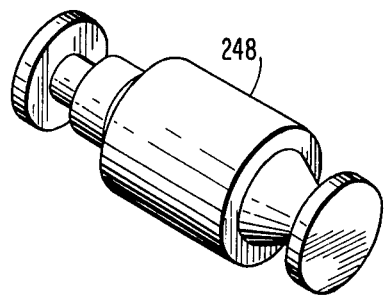

In contradistinction to the previously known bumper systems depicted in FIGS. A, B, or C, the subject hydraulic cushioning unit of the subject invention 248, note FIG. 12D, displays a generally rectangular energy dissipation curve wherein maximum forces are realized in a very short stroke and are maintained in a generally constant level throughout the stroke until the input energy is dissipated. Once the energy is dissipated, the deflection or stroke travel terminates and the force level falls to essentially zero. The unit is then restored in a controlled yet rapid manner with negligible rebound energy.

SUMMARY OF MAJOR ADVANTAGES OF THE INVENTION

In describing in detail a preferred embodiment of the invention, several distinct advantages of the subject cushioning unit have been specifically and inherently delineated.

In brief summary, it will be appreciated that the subject marine bumper hydraulic cushioning unit comprises a significant advance in marine bumper design and exhibits to a nearly perfect kinetic energy dissipation diagram, wherein a significant amount of energy is dissipated for an initial small deflection which is maintained substantially constant until the input energy is dissipated whereupon the unit substantially ceases to travel and rapidly restores itself to a fully extended posture.

Further, the subject isolation and restoring assembly of the subject invention isolates the hydraulic cushioning unit from a generally hostile marine environment while providing rapid and effective restoring capacity for the hydraulic unit.

Universal mounting assemblies at the ends of the hydraulic cushioning unit minimizes the transmission of lateral forces into the unit and thus prolongs the life of the hydraulic cushioning assembly.

Yet a further significant advantage of the invention entails the specific hydraulic cushioning unit as applied in a marine environment wherein exponential porting provides constant energy dissipation and normally preset check valve assemblies provide an inexpensive yet highly reliable performance pattern for dissipating impact energies occasioned in a marine environment.

Still further a significant advantage resides in the provision of flexure and shear forces within the frustoconical elastomeric members of the restoring assembly which combine to rapidly restore the cushioning unit to an extended position ready to accommodate future impact loads.

While the invention has been described with reference to a preferred embodiment, it will be appreciated by those skilled in the art that additions, deletions, modifications and substitutions or other changes not specifically described may be made which will fall within the purview of the appended claims.

What is claimed is:
1. An encapsulated shock absorber, comprising:
   a. cylinder means having wall means including, side wall means, first end wall means, and second end wall means;
   b. piston means slidably disposed within said hydraulic cylinder means and including,
      i. piston body means, translatably mounted within said side wall means of said cylinder means, for defining a buff-end impedance zone between said second end wall means and said piston body means and a restored end impedance zone between said first end wall means and said piston body, and
      ii. piston rod means translatably projecting through said first end wall means of said cylinder means and having a first end thereof connected to said piston body means;

c. impedance means associated with said hydraulic cylinder means and said piston means for cushioning translation of said piston body means from a normal position of adjacency to said first end wall wherein said apparatus is in an extended posture operably ready to dissipate energy imparted thereto to a position of adjacency to said second end wall wherein said apparatus is in a contracted posture operably following dissipation of energy imparted thereto including:

i. generally low pressure fluid tight return flow passage means surrounding at least a portion of said side wall means of said cylinder means and being operable to receive fluid expelled from said buff end impedance zone in response to movement of said piston body means toward said second end wall means;

ii. at least one buff means, extending through said cylinder means in the vicinity of said second end wall means, for providing fluid communication between said buff end impedance zone and said return flow passage means and being operable to impede the flow of fluid out of said buff end impedance zone in response to movement of said piston body means toward said second end wall means; and iii. at least another draft port means extending through said cylinder means for providing fluid communication between said restored end impedance zone and said return flow passage means and being operable to impede the flow of fluid out of said restored end impedance zone in response to restoring force induced movement of said piston body means toward said first end wall means;

d. capsule means for encapsulating said hydraulic cylinder means, said impedance means and said piston means so as to isolate said hydraulic cylinder means, impedance means and said piston means from an ambient environment and for exerting a positive, outward bias upon said second, distal, end of said piston rod means away from said cylinder means for urging said piston body means toward a normal restored position adjacent to said first end wall of said cylinder means, including:

i. a longitudinally extending housing means surrounding said cylinder and passageway means;

ii. a first elastomeric annulus connected to and extending between one end of said housing means and one of said cylinder means generallly at the second end wall end thereof and a second distal end of said piston rod means;

iii. annular means connected to and extending between the other end of said housing and the other of said cylinder means generally at the second end wall thereof and a second distal end of said piston rod means;

e. normally closed valve means, associated with at least one of said buff port means, for providing a restricted hydraulic flowpath in response to all forces of less than a predetermined magnitude tending to move said first and second objects toward each other and for providing a less restricted hydraulic flowpath in response to all forces of at least said predetermined magnitude tending to move said first and second objects toward each other; and f. a quantity of hydraulic fluid confined within said buff end impedance zone, restored end impedance zone and impedance means and isolated from pressurized contact with said capsule means.

2. A shock absorber as defined in claim 1 wherein:

said annular means comprises a second elastomeric annulus; and said capsule means comprises bias means for continuously biasing said second distal end of said piston rod means away from said cylinder means.

3. An apparatus for cushioning movement and dissipating energy as defined in claim 1 wherein said at least one port means comprises:

a plurality of ports radially extending through said cylinder side wall means and being longitudinally spaced from the buff end in an exponential pattern toward the restored end of said cylinder means.

4. An encapsulated shock absorber for cushioning movement and dissipating energy as defined in claim 3 wherein:

said valve means includes a plurality of normally closed preset check valve means, one being positioned in each of an initial plurality of said plurality of radially extending exponentially spaced ports with the remainder of the radial ports positioned nearest to the restored end of said cylinder means remaining unvalved, for dissipating first low level buff forces tending to translate said piston body means toward the second end wall means by displacing fluid from said buff end impedance zone into said annular return flow passage through said radial ports positioned nearest to the restored end of said cylinder means without overcoming the preset condition of said plurality of check valve means and for dissipating second high level buff forces tending to translate said piston body means toward the second end wall means by overcoming the preset condition of at least one of said normally closed check valve means and displacing fluid through said overcome check valve means into said annular chamber.

5. An encapsulated shock absorber as defined in claim 4 wherein said plurality of check valves include:

means for maintaining a second, higher level preset condition and greater flow capacity wherein third very high level impact forces tending to translate said piston body means toward the second end wall means of said cylinder means will be dissipated by displacing fluid from said buff end impedance zone into said annular return flow passage through said plurality of check valve means in said second greater flow capacity condition.

6. An encapsulated shock absorber for resisting movement of two objects toward each other in a marine environment comprising:

a. a piston means for operably abuting a first object;

b. a cylinder means for operably abuting a second object and for cooperating with said piston means to hydraulically resist forced movement of said first and second objects toward each other;

c. a quantity of hydraulic fluid within said cylinder;

d. encasement means isolated from said fluid, for encasing said piston means and cylinder means from an ambient environment and for elastomerically biasing said piston means and cylinder means toward extended relative position; and e. housing means, spaced from and encased within said encasement means, for providing a fluid-tight flow passage external of said piston and cylinder means and for receiving fluid expelled from said cylinder means in response to movement of said objects toward each other.

f. valve means, associated with at least one of said piston and cylinder means, for providing a restricted hydraulic flowpath in response to all forces of less than a predetermined magnitude tending to move said first and second objects toward each other and for providing a less restricted hydraulic flowpath in response to all forces of at least said predetermined magnitude tending to move said first and second objects toward each other.

* * * * *